(12) United States Patent
Messmer et al.

(10) Patent No.: US 9,226,048 B2
(45) Date of Patent: Dec. 29, 2015

(54) VIDEO DELIVERY AND CONTROL BY OVERWRITING VIDEO DATA

(75) Inventors: Neil W. Messmer, Langley (CA); Lewis Johnson, Delta (CA)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 256 days.

(21) Appl. No.: 13/580,106

(22) PCT Filed: Feb. 15, 2011

(86) PCT No.: PCT/US2011/024854
§ 371 (c)(1),
(2), (4) Date: Aug. 20, 2012

(87) PCT Pub. No.: WO2011/103075
PCT Pub. Date: Aug. 25, 2011

(65) Prior Publication Data
US 2012/0315011 A1    Dec. 13, 2012

Related U.S. Application Data

(60) Provisional application No. 61/306,903, filed on Feb. 22, 2010.

(51) Int. Cl.
*H04N 5/93* (2006.01)
*H04N 21/84* (2011.01)
*H04N 21/8358* (2011.01)
*G06T 1/00* (2006.01)
*H04N 21/235* (2011.01)
*H04N 7/08* (2006.01)
*H04N 7/025* (2006.01)

(52) U.S. Cl.
CPC .............. *H04N 21/84* (2013.01); *G06T 1/0028* (2013.01); *H04N 7/08* (2013.01); *H04N 21/235* (2013.01); *H04N 21/8358* (2013.01); *G06T 2200/16* (2013.01); *G06T 2201/0051* (2013.01); *H04N 7/025* (2013.01)

(58) Field of Classification Search
CPC . H04N 21/8358; H04N 21/84; H04N 21/235; H04N 7/08; H04N 7/025; G06T 1/0028; G06T 2201/0051; G06T 2200/16
See application file for complete search history.

(56) References Cited

U.S. PATENT DOCUMENTS

| 5,517,252 | A |   | 5/1996  | Plantholt |
| 5,940,134 | A | * | 8/1999  | Wirtz ............................. 348/473 |
| 6,640,005 | B1 | * | 10/2003 | Westerman et al. .......... 382/166 |
| 6,785,814 | B1 | * | 8/2004  | Usami et al. .................. 713/176 |

(Continued)

FOREIGN PATENT DOCUMENTS

| CN | 1976425 | 6/2007 |
| EP | 0543038 | 5/1993 |

(Continued)

*Primary Examiner* — Thai Tran
*Assistant Examiner* — Stephen Smith

(57) ABSTRACT

Systems, apparatus and methods are provided for generating, delivering, processing and displaying video data to preserve the video creator's creative intent. Metadata which may be used to guide the processing and display of the video data is dynamically generated and embedded in the video data throughout a video delivery pipeline. The metadata may be written in chrominance data for black video frames, black mattes or bars framing an image, and/or in the other image areas for which luminance values are zero or below a threshold value.

16 Claims, 11 Drawing Sheets

(56) References Cited

U.S. PATENT DOCUMENTS

| | | |
|---|---|---|
| 7,013,145 B1 | 3/2006 | Centore, III |
| 8,024,632 B1 | 9/2011 | Konrad |
| 2004/0186735 A1 | 9/2004 | Ferris |
| 2004/0228605 A1* | 11/2004 | Quan et al. ............... 386/46 |
| 2004/0249861 A1 | 12/2004 | Hoshino |
| 2005/0193205 A1* | 9/2005 | Jacobs et al. ............ 713/176 |
| 2005/0220322 A1 | 10/2005 | Olesen |
| 2005/0248561 A1 | 11/2005 | Ito |
| 2006/0072780 A1 | 4/2006 | Zarrabizadeh |
| 2008/0178246 A1* | 7/2008 | Blanchard ................ 725/131 |
| 2008/0195977 A1* | 8/2008 | Carroll et al. ............ 715/853 |
| 2008/0276325 A1* | 11/2008 | Quan ......................... 726/33 |
| 2010/0100971 A1 | 4/2010 | Geyzel |
| 2010/0135384 A1* | 6/2010 | Berkvens et al. ........ 375/240.2 |
| 2010/0157154 A1* | 6/2010 | Kobayashi et al. ........... 348/557 |
| 2011/0154426 A1* | 6/2011 | Doser et al. .................. 725/118 |
| 2011/0316973 A1 | 12/2011 | Miller |

FOREIGN PATENT DOCUMENTS

| | | | |
|---|---|---|---|
| JP | 2009-253854 | 10/2009 | |
| WO | 90/14732 | 11/1990 | |
| WO | 91/16793 | 10/1991 | |
| WO | 97/22206 | 6/1997 | |
| WO | 03/058946 | 7/2003 | |
| WO | 2005/071873 | 8/2005 | |
| WO | 2007/142624 | 12/2007 | |
| WO | WO 2009095732 A1 * | 8/2009 | ............ G11B 27/30 |
| WO | 2011/103258 | 8/2011 | |

\* cited by examiner

VIDEO DELIVERY AND CONTROL BY OVERWRITING VIDEO DATA

CROSS-REFERENCE TO RELATED APPLICATIONS

This application claims priority to U.S. Provisional Patent Application No. 61/306,903 filed 22 Feb. 2010, which is hereby incorporated by reference in its entirety.

TECHNICAL FIELD

This invention relates to systems, apparatus and methods for delivering video data and/or controlling display of video data. Some embodiments provide systems, apparatus and methods for delivering other data in a stream of video data. Some embodiments provide systems, apparatus and methods for generating, delivering, processing and displaying video data to preserve the video creator's creative intent.

BACKGROUND

FIG. 1 is a flowchart of a conventional video delivery pipeline 100 showing various stages from video capture to video content display. A sequence of video frames 101 is captured at block 102. Video frames 101 may be digitally captured (e.g. by a digital camera) or generated by a computer (e.g. using computer animation) to provide a stream of video data 103. Alternately, video frames 101 may be captured on film by a film camera. The film is converted to a digital format to provide a stream of video data 103.

Video data 103 is provided to a processor at block 104 for post-production editing. Block 104 post-production editing may include adjusting or modifying colors or brightness in particular areas of an image to enhance the image quality or achieve a particular appearance for the image in accordance with the video creator's creative intent. Other editing (e.g. scene selection and sequencing, image cropping, addition of computer-generated visual special effects, etc.) may be performed at block 104. During block 104 post-production editing, video images are viewed on a reference display.

Following post-production, video data 103 is delivered at block 106 to a display subsystem. As seen in FIG. 1A, block 106 delivery includes an encoder stage 107A for driving broadcast or transmission of video data 103 over a video distribution medium 105 (e.g. satellite, cable, DVD, etc). A decoder stage 107B is located at the display end of block 106 to decode video data 103 transmitted over medium 105. The display subsystem may include a video processor and a display. At block 108, video data 103 is provided to the video processor for processing and/or decoding. Video data 103 is output to the display at block 110 to display a sequence of images to a viewer.

To improve the quality of the displayed images, video data 103 may be driven through video delivery pipeline 100 at a relatively high bit rate so as to facilitate an increased bit depth for defining RGB or chroma values for each chrominance (color) channel. For example, a stream of video data 103 may comprise 8, 10 or 12 bits of data for each chrominance channel of a pixel. In other embodiments, a stream of video data 102 may comprise more than 12 bits of data for each chrominance channel of a pixel.

Despite using a high bit depth for each chrominance channel, variations in display characteristics (such as luminance range, gamut, etc.) may affect the appearance of an image rendered on a display so that the image rendered does not match the creative intent of the video's creator. In particular, the perceived color or brightness of an image rendered on a particular display subsystem may differ from the color or brightness of the image as viewed on the reference display during block 104 post-production editing.

Moreover, methods applied at processing or display stages of a conventional video delivery pipeline, such as those stages represented by blocks 104, 108 and 110 of video delivery pipeline 100 (FIG. 1), are typically performed in a pre-configured manner without taking into account processing which may have occurred at other stages of video delivery pipeline 100. For example, the block 110 methods for displaying video data 103 may be performed without knowledge of how prior processing steps in video delivery pipeline 100 were carried out, such as block 104 post-production editing. The block 110 display methods may not be suitable for rendering an image on the display in a manner which preserves the video creator's creative intent, as determined by block 104 post-production editing.

There is a general desire for systems, apparatus and methods for generating, delivering, processing and displaying video data to preserve the video creator's creative intent. There is a general desire for systems, apparatus and methods for providing information which may be used to guide downstream processing and/or display of video data.

SUMMARY

Systems, apparatus and methods are provided for providing video data including metadata to a display subsystem. The video data may be transmitted or provided to the display subsystem using systems, apparatus and methods suitable for the type of content delivery (e.g. television broadcast over satellite, cable, or high-definition networks; streaming multimedia over IP or wireless networks; playback from DVD or other storage media, etc.). In particular embodiments, metadata is generated and written in video data at one or more stages of a video delivery pipeline. The metadata may provide information relating to: characteristics of a reference display used to edit the video data, characteristics of the environment in which the reference display is situated, characteristics of the edited image (e.g. luminance and gamut), characteristics of the viewing environment in which the display of the display subsystem is situated, etc.

The metadata is delivered with the video data to downstream apparatus such as a display subsystem. The metadata may be delivered and received by the downstream apparatus in advance of a video frame for which the embedded metadata is to be applied. The metadata may be extracted and decoded at the display subsystem and applied to configure a display of the display subsystem and/or to process the video data to adjust the video data for the display (e.g. to match the creator's artistic intent).

The metadata may be inserted in the video data by overwriting chrominance data with metadata. Metadata may be written in chrominance portions of video data for: black video frames, black mattes or bars framing an image, or other low luminance image areas or pixels for which luminance values are zero or below a threshold value. Other types of data may be written in chrominance portions of video data using the methods described herein.

Methods of encoding the metadata are provided so as to avoid unintentional communication of reserved video words (e.g. reserved pixel values) and/or reserved metadata words (e.g. start or end of frame headers).

In addition to the exemplary aspects and embodiments described above, further aspects and embodiments will become apparent by reference to the drawings and by study of the following detailed descriptions.

BRIEF DESCRIPTION OF DRAWINGS

Exemplary embodiments are illustrated in referenced figures of the drawings. It is intended that the embodiments and figures disclosed herein are to be considered illustrative rather than restrictive.

DESCRIPTION

Throughout the following description, specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Example embodiments provide for systems, apparatus and methods useful in a video delivery pipeline. Metadata is written in video data and transmitted with the video data through the video delivery pipeline. The metadata may, for example, be useful for guiding downstream devices in processing video data and/or guiding video playback on a display. The display may be a flat panel display (e.g. LCD, LED, OLED, high-dynamic range, or plasma display) such as may be provided in a television, computer monitor, laptop, cellular phone or handheld mobile device, and the like, or any other display capable of displaying video data.

Metadata may be dynamically generated and written in the video data stream at various stages throughout the video delivery pipeline including video capture, post-production editing, and pre-display processing. The metadata may define parameters, including, for example: gamut and other characteristics of a reference display used in post-production editing, location of light sources in an image, protected colors of an image which should not be altered, etc. Such metadata may be decoded and processed by a decoder and/or a display and used for processing of video data and/or display management and configuration to control and enhance video playback on the display. Metadata may be used to control a display (and/or process video data for the display) to display video in a manner which preserves the video creator's creative intent.

In some video formats, video data includes chrominance data which is represented separately from luminance data. According to embodiments described herein, chrominance data for particular video frames or areas of video frames may be overwritten with metadata. For pixels for which the luminance level is zero or below a threshold value (or pixel values which represent a black pixel level), chrominance data may be overwritten with bits of metadata 225 without substantially affecting the appearance of the displayed image.

Figure 3A:
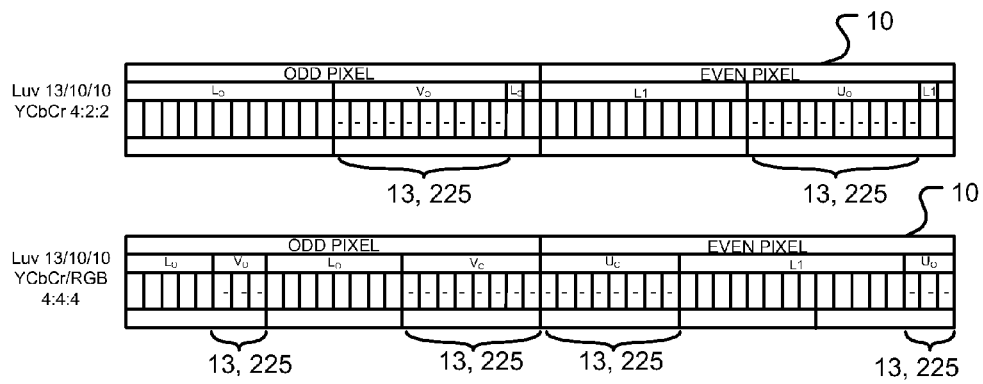
FIG. 3A illustrates frames of video data in a visual-dynamic range (VDR) format, containing chrominance data that may be overwritten with metadata according to particular embodiments.
Figure 3B:
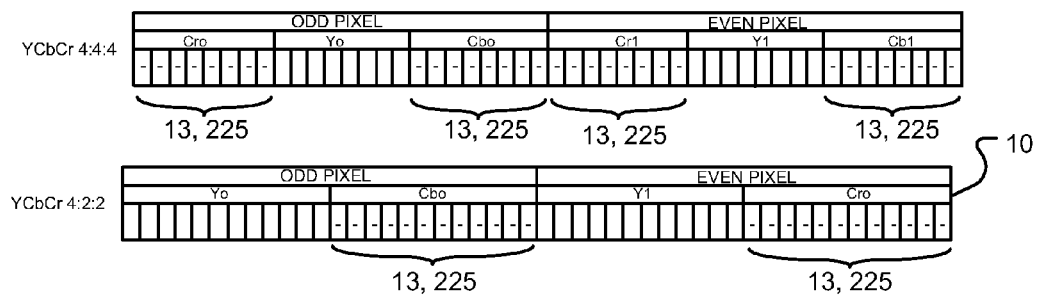
FIG. 3B illustrates frames of video data in non-VDR formats, containing chrominance data that may be overwritten with metadata according to particular embodiments.

Metadata may be written in chrominance portions or chrominance channels of video data which may include fields, values, bits, etc. FIG. 3A shows chrominance portions 13 of data frames 10 in VDR format, which may be overwritten with metadata 225. FIG. 3B shows chrominance portions (Cr, Cb) 13 of data frames 10 in YCbCr formats, which may be overwritten with metadata 225. VDR format is a video format described in co-owned PCT Application No. PCT/US2010/022700 for "EXTENDED DYNAMIC RANGE AND EXTENDED DIMENSIONALITY IMAGE SIGNAL CONVERSION AND/OR DELIVERY VIA LEGACY VIDEO INTERFACES" which is herein incorporated by reference.

Figure 2A:
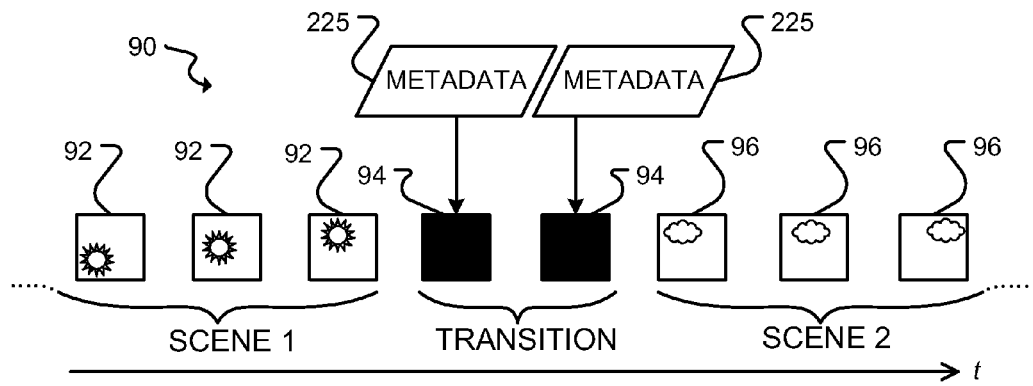
FIG. 2A illustrates delivery of a sequence of video frames, some of which may be used to carry metadata, according to a particular embodiment.

Metadata may be carried in video data using one or more of the following methods, for example:

Video data for black video frames may be overwritten with metadata relating to an upcoming scene, program, or other sequence of frames. FIG. 2A shows a sequence of frames 90 displaying scenes 1 and 2. As seen in FIG. 2A, one or more black video frames 94 are displayed in the transition period between scene 1's video frames 92 and scene 2's video frames 96. The black video frames 94 may have been inserted in the video data during post-production editing to separate scenes 1 and 2. Metadata 225 for scene 2 may be carried in the chrominance portions of video data representing the black video frames 94. In some embodiments, at one or more stages in the video delivery pipeline, black video frames (such as frames 94 of FIG. 2A) may be inserted in the video data between scenes or in the middle of a scene, for the purpose of carrying metadata.

Figure 2B:
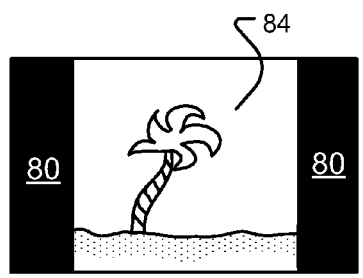
FIGS. 2B, 2C, 2D and 2E illustrate video frames containing areas represented by video data that may be used to carry metadata, according to particular embodiments.
Figure 2C:
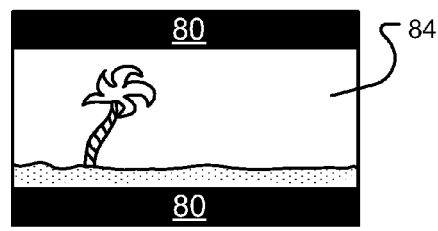
Figure 2D:
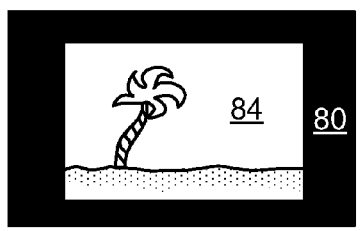
Figure 2E:
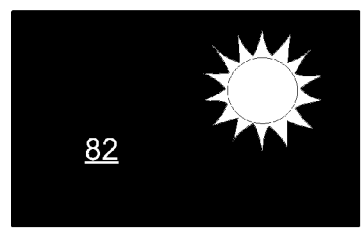

Video data representing mattes or black bars of video frames may be overwritten with metadata for an upcoming video frame or video frame sequence (e.g. scene, program, or the like). For example, in certain embodiments, metadata may be written in the chrominance portions of video data representing the mattes or black bars 80 which appear at the sides and/or above and/or below an image 84 in particular video formats including, for example, pillarboxed (FIG. 2B), letterboxed (FIG. 2C) and windowboxed (FIG. 2D) formats.

Video data representing other low luminance image areas may be overwritten with metadata for an upcoming video frame or video frame sequence (e.g. scene, program, or the like). For example, metadata may be written in chrominance portions of video data representing image areas for which the pixels' luminance values are zero or below a threshold value.

In other embodiments, metadata may be written in chrominance portions for any area with constant hue or chrominance, such as, for example, a blue screen or area. In still other embodiments, metadata may be written in all of the video data (e.g. both luminance and chrominance data) for a particular video frame or image area. A metadata header may be written in a video frame in a predefined manner (e.g. such as in chrominance portions of the video data). The metadata header defines the number of subsequent pixels that contain metadata and the portions of data in which metadata is encoded (e.g. in chrominance portions only, or in both luminance and chrominance portions). A downstream apparatus decodes the metadata header and uses the header information to decode or extract metadata from the video data. A downstream apparatus, upon decoding the metadata header, may skip playback of the video frame containing metadata. The display may repeat playback of a preceding video frame, while extracting and/or processing the metadata from the video frame. In certain embodiments, the metadata header may define the pixel value of the pixels at which metadata is extracted, which is to be used to drive display playback.

Figure 1:
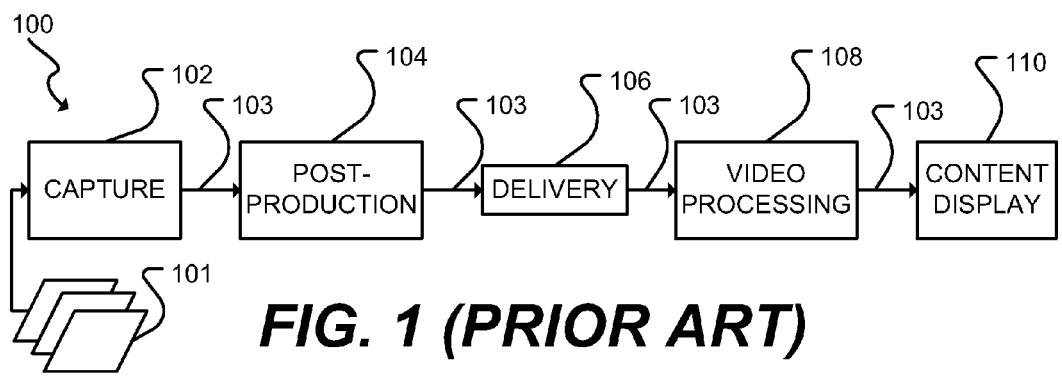
FIG. 1 is a flowchart illustrating the stages of a conventional video delivery pipeline.
Figure 1A:
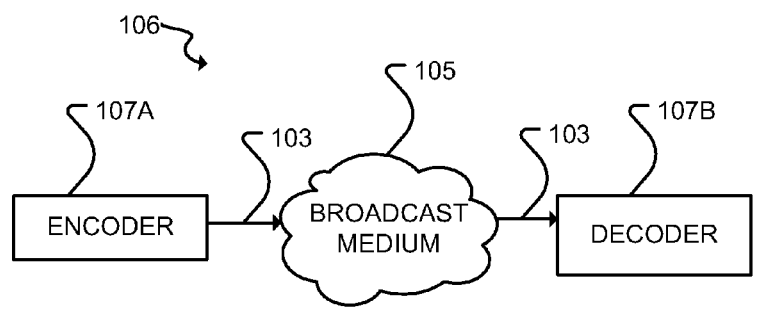
FIG. 1A is a flowchart illustrating the stages of delivery of video data that may be performed in the FIG. 1 video delivery pipeline.
Figure 4:
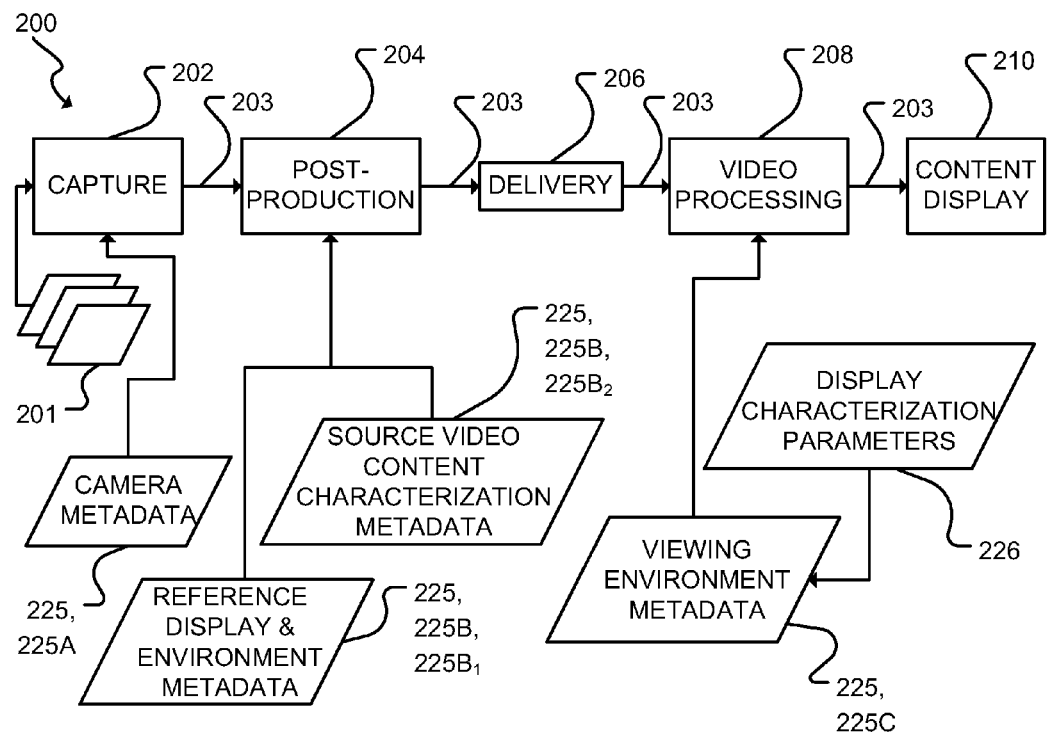
FIG. 4 is a flowchart illustrating the flow of video data through a video delivery pipeline and a method of generating, delivering, processing and displaying video data according to one embodiment to preserve the video creator's creative intent.

FIG. 4 is a flowchart showing the flow of data through a video delivery pipeline 200 according to a particular embodiment. Video delivery pipeline 200 incorporates similar stages as those depicted in video delivery pipeline 100 of FIG. 1, and accordingly, similar reference numerals are used to identify the similar stages, except that in video delivery pipeline 200 of FIG. 4, the reference numerals begin with a "2" instead of a "1". At one or more stages of video delivery pipeline 200, metadata 225 may be generated and embedded in a stream of video data 203 for use at a downstream stage. Metadata 225 is transmitted along with video data 203 through video delivery pipeline 200 to guide downstream devices in processing the video data and/or to guide video playback at a display subsystem at block 210. Video data 203, including embedded metadata 225, may be delivered to the display subsystem at block 206 using systems, apparatus and methods suitable for the type of video content delivery (e.g. television broadcast over satellite, cable, or high-definition networks; streaming multimedia over IP or wireless networks; playback from DVD or other storage media, etc.).

In the FIG. 4 embodiment, camera metadata 225A is generated and embedded in video data 203 at block 202. Camera metadata 225A may be generated based on the camera settings and video frame capture environment. Camera metadata 225A may comprise, for example, camera parameters which provide a snapshot of the camera settings during video frame capture. Such camera parameters may include aperture (f-stops), lens, shutter speed, sensitivity (ISO ratings) and the like. These camera parameters may be used to guide subsequent steps in video delivery pipeline 200, such as color adjustments (e.g. color timing) during post-production editing at block 204, or display configuration at block 210.

At block 204, post-production metadata 225B is generated and embedded in video data 203. Post-production metadata 225B may include: reference display and environment metadata $225B_1$ and source video content characterization metadata $225B_2$. Post-production metadata 225B may be used to guide subsequent steps in video delivery pipeline 200, such as display configuration at block 210.

Reference display and environment metadata $225B_1$ may describe the reference display configuration and studio or viewing environment used in the block 204 post-production editing. For example, with respect to the reference display used to display video data 203 during the block 204 post-production editing, reference display and environment metadata $225B_1$ may include parameters such as:

a 3D color gamut mapping describing the tone and gamut boundaries of the reference display at a detailed resolution;

a reduced set of parameters defining the tone and gamut boundaries of the reference display (which may be used to estimate a 3D color gamut mapping);

system tonal response parameters describing the tonal response of the reference display for each chrominance channel;

and/or the like.

Reference display and environment metadata $225B_1$ may also include parameters describing the studio environment in which video content was color-timed or edited on a reference display during the block 204 post-production editing. Such parameters may include ambient luminance and ambient color temperature.

Source video content characterization metadata $225B_2$ may describe post-production edited video content including information which may identify or provide:

a location map of light sources in an image, or of reflective or emissive objects in an image;

gamut of the video source content;

areas of an image which are color-timed purposely out of gamut of the reference display;

protected colors that should not be altered during pre-display processing by the video processor or during display configuration;

an image histogram characterizing the image in terms of luminance or gamut (for example, such information may be used by downstream devices to determine average luminance to refine tone and gamut mapping);

a scene change or reset flag, to alert downstream devices that any statistics or hysteresis from previous video frames are no longer valid;

a motion map characterizing the video content to identify objects in motion, which may be used by downstream devices in combination with the light source location map to guide tone and gamut mapping;

an indication of the source of color-timed content (e.g. direct from the camera, or post-production editing);

director's creative intent settings which may be used to control downstream devices such as a decoder/television or other display. For example, such settings may include: display mode control providing the ability to control the display to operate in a particular mode (e.g. vivid, cinema, standard, professional, etc.); content type (e.g. animation, drama, sports, games, etc.) which may be used to determine an appropriate gamut or tone mapping or the like; tone mapping (e.g. customized tone mapping parameters or curves which may be used to guide tone expansion at the display); and gamut mapping (e.g. customized gamut mapping parameters which may be used to guide gamut expansion at the display);

and/or the like.

Figure 4A:
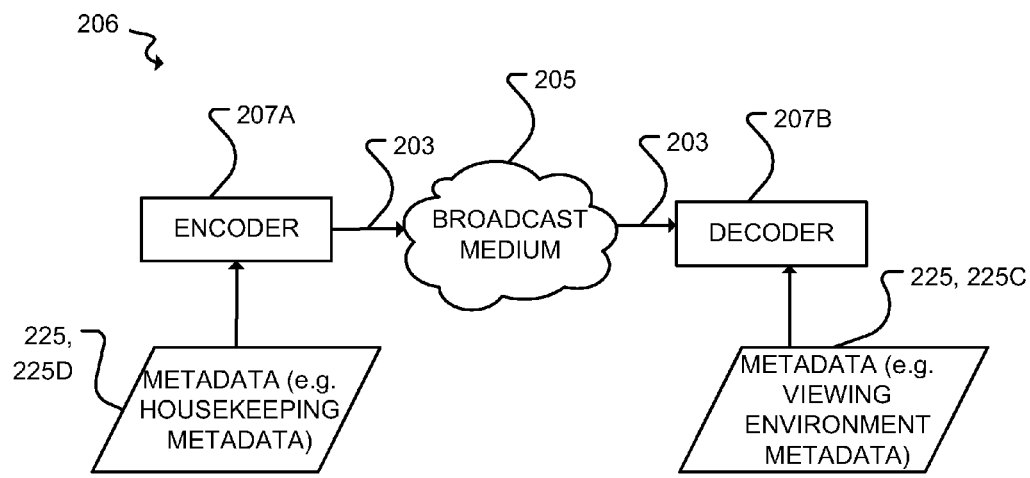
FIG. 4A is a flowchart illustrating the stages of delivery of video data that may be performed in the FIG. 4 video delivery pipeline.

Video data 203 is delivered to a display subsystem at block 206. As seen in FIG. 4A, block 206 delivery may include an encoder stage 207A for driving distribution, broadcast or transmission of video data 203 over a video distribution medium 205 such as satellite, cable, or high-definition networks; IP or wireless networks; or DVD or other storage media, etc. A decoder stage 207B may be provided at the display end of block 206 to decode video data 203 distributed over medium 205. Decoder stage 207B may be implemented by a set-top box, for example, or by a decoder within the display subsystem. At blocks 206 and/or 208, viewing environment metadata 225C and/or other metadata 225 may be embedded in video data 203. Viewing environment metadata 225C may comprise, for example:

Advanced Video Coding (AVC) VDR encoder data providing reference monitor tone mapping or gamut curves or ambient luminance of the reference environment. At least some of this information may be determined at the decoder stage 207B (or by the video processor) with knowledge of the display characteristics (e.g. by reading the Extended Display Identification Data (EDID) of the display) and environment of the display subsystem. In some embodiments, at least some of this information may be determined at the studio during post-production processing of the video data.

Parameters describing the environment in which the display of the display subsystem is situated. Such parameters may include, for example, ambient luminance and/or tone or color temperature.

Viewing environment metadata 225C may be used to guide processing of video data at block 208 and/or display configuration at block 210.

The display subsystem comprises a video processor for processing incoming video data 203 at block 208. The video processor of the display subsystem may perform signal processing on video data 203 based on metadata 225 extracted from video data 203 (e.g. metadata 225A) and/or known display characteristics associated with the display of the display subsystem. Video data 203 may be processed and adjusted for the display in accordance with display characterization parameters 226 and/or metadata 225.

Other metadata 225 that may be embedded in video data 203 at blocks 206 and/or 208, or at other stages of video delivery pipeline 200, includes housekeeping metadata 225D (for managing distribution rights and the like) such as, for example:

watermarking data indicating where the video content was generated, distributed, modified, etc.;

fingerprinting data providing a description of the video content for searching or indexing purposes, and the like;

protection data indicating who owns the video content and/or who has access to it;

and/or the like.

Viewing environment metadata 225C may be generated based at least in part on display characterization parameters 206 associated with the display of the display subsystem. In some embodiments, viewing environment metadata 225C, source video content characterization metadata $225B_2$ and/or housekeeping metadata 225D may be created or provided by analysis of video data 103 at the encoder stage 207A, the decoder stage 207B and/or by the video processor at block 208.

At block 210, display configuration may be performed on a display of the display subsystem. Appropriate parameters for display configuration may be determined based on display characterization parameters 226 and/or metadata 225, such as camera metadata 225A, post-production metadata 225B (including reference display and environment metadata $225B_1$ and source video content characterization metadata $225B_2$) and viewing environment metadata 225C. The display is configured in accordance with such parameters. Video data 203 is output to the display.

Metadata 225 that is used for processing of video data 203 at block 208 and display configuration at block 210 is delivered in the video data stream so that metadata 225 is received at the display subsystem (including the video processor and display) prior to its application. In some embodiments, metadata 225 is delivered so that it is received by the display subsystem at least one video frame ahead of the frame at which the metadata 225 is to be applied. In certain embodiments, metadata 225 is delivered one video frame ahead and application of metadata 225 at blocks 208 and/or 210 may be triggered upon detection of a new video frame in the incoming video stream.

Figure 7:
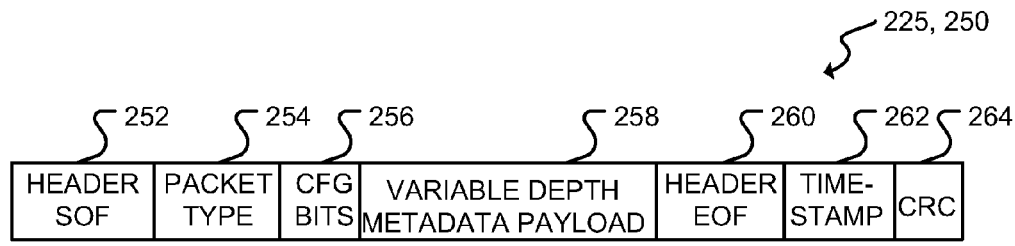
FIG. 7 illustrates a metadata packet according to one embodiment.

In particular embodiments, systems and/or apparatus of video delivery pipeline 200 comply with a metadata protocol defining a metadata structure. FIG. 7 illustrates a metadata structure or packet 250 of metadata 225 according to a particular embodiment that may be generated, for example, at any one of blocks 202, 204, 206 or 208 of the video delivery pipeline 200 of FIG. 4 and delivered downstream in the pipeline. Packet 250 is framed with a header. In the illustrated embodiment of FIG. 7, packet 250 includes the following fields:

a start of frame (SOF) header 252 defining the header with a start of frame bit set;

a packet type 254 defining the type of metadata in the payload (e.g. gamut parameter, scene change flag, image histograms, etc.) and format or pattern of the subsequent metadata;

CFG bits 256 defining a configurable portion of the framing structure (e.g. CFG bits 256 may define whether a timestamp is enabled for the packet, and how to apply the timestamp);

metadata payload 258 which may be variable in length;

end of frame (EOF) header 260 defining the header with an end of frame bit set;

timestamp 262 (optional) indicating when data in metadata payload 258 is to be applied (e.g. a certain number of video frames or scenes after metadata packet 250 is received, or after some other delay); and a checksum such as, for example, a CRC (cyclic redundancy check) value 264 to enable verification of metadata packet 250.

Figure 7A:
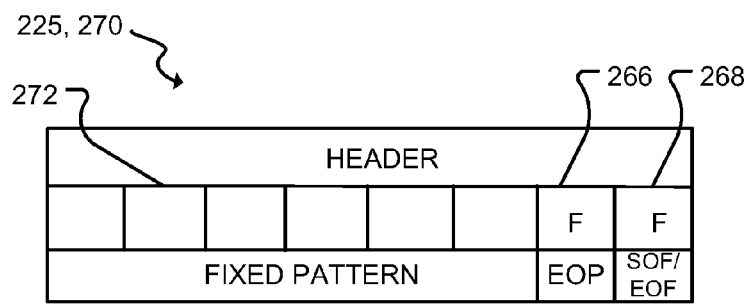
FIG. 7A illustrates a header that may be used to frame the metadata packet of FIG. 7.

FIG. 7A illustrates a header 270 that may be used to define the start (i.e. SOF header 252) or end (i.e. EOF header 260) of a metadata packet 250 as shown in FIG. 7. In the illustrated embodiment, header 270 begins with a plurality of bits in a predetermined pattern 272. Header 270 ends with an end of payload (EOP) flag or bit 266, and an SOF/EOF flag or bit 268 (e.g. 0/1). The SOF/EOF flag 268 determines whether header 270 is an SOF header 252 or an EOF header 260. The EOP flag 266 may be valid only if the EOF flag 268 is set. Setting the EOP flag 266 indicates that the metadata packet 250 contains the last portion of a metadata payload. The EOP flag 266 enables a metadata payload to be split among several metadata packets 250, which may be split across video frames.

Figure 11:
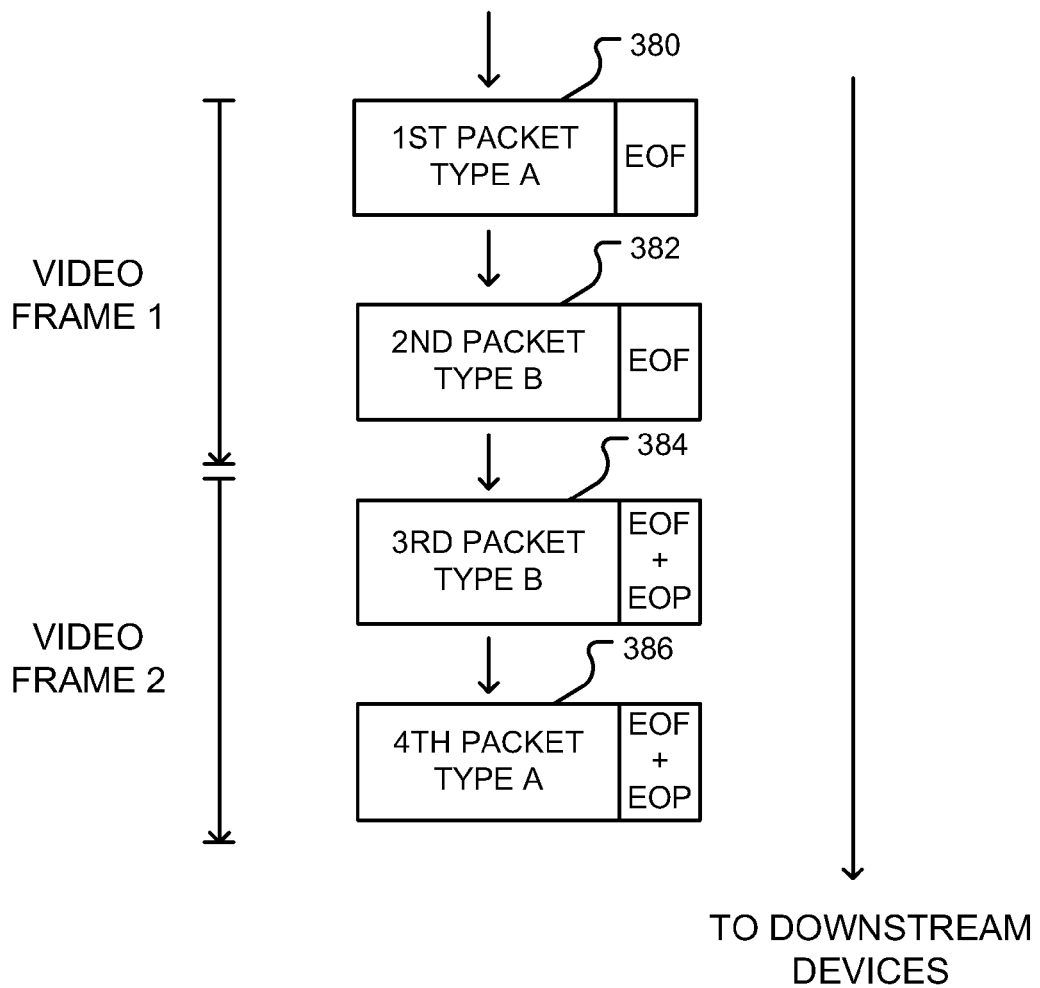
FIG. 11 shows a sequence of metadata packets containing different types of metadata transmitted over two consecutive video frames.

The EOP flag 266 enables packets carrying different types of metadata to be delivered over multiple video frames, as seen in FIG. 11. The type of metadata carried in a packet may be indicated by packet type 254 in the header (see FIG. 7). In the illustrated example, a first packet 380 carrying type A metadata is embedded in video data of video frame 1. During embedding of type A metadata in the video data stream, type B metadata, having a higher priority than metadata type A, is received. To interrupt transmission of type A metadata in favour of type B metadata, an EOF flag is set to conclude first packet 380 (however, the EOP flag is not set as there is remaining type A metadata to be transmitted). A second packet 382 carrying the type B metadata may then be embedded in video data of video frame 1. In the illustrated example, video frame 1 does not have sufficient chrominance portions for delivery of all of the type B metadata. Thus, toward the end of video frame 1 an EOF flag is set to indicate the end of second packet 382 (however, the EOP flag is not set as there is remaining type B metadata to be transmitted). A third packet 384 carrying the remaining type B metadata may be embedded in video data of video frame 2. The third packet 384 may be terminated with an EOF flag and an EOP flag to indicate the end of the packet and end of the metadata payload for the type B metadata. Delivery of type A metadata may then resume. In the illustrated example, all remaining type A metadata (which has been saved during embedding of metadata type B) is retrieved and carried in a fourth packet 386 of metadata embedded in the video data of video frame 2. The fourth packet 386 may be terminated with an EOF flag and an EOP flag to indicate the end of the packet and end of the metadata payload for the type A metadata.

At one or more of blocks 202, 204, 206 or 208 of video delivery pipeline 200, metadata 225 may be generated and written in the video data. The metadata is delivered through the pipeline with the video data. The metadata may be applied by a downstream apparatus (such as a display subsystem) to process the video data and/or configure a display for video playback of a video frame sequence.

Metadata is delivered to a downstream apparatus in the video delivery pipeline in advance of the particular video frame or frame sequence at which the metadata is to be applied by such downstream apparatus. In particular embodiments, metadata for an upcoming scene or program is delivered with one or more video frames preceding such scene or program.

In some embodiments, the metadata may be delivered with a timestamp indicating when the metadata is to be applied by a downstream apparatus (e.g. video decoder, processor, or display) to process the video data or manage or configure the display. The timestamp may be defined in terms of a frame delay indicating that the metadata is to be applied at a certain number of video frames after the metadata has been received. In other embodiments, the timestamp may be defined in terms of a time delay, a frame sequence number, a time relative to the start of the video, or the like.

Figure 8:
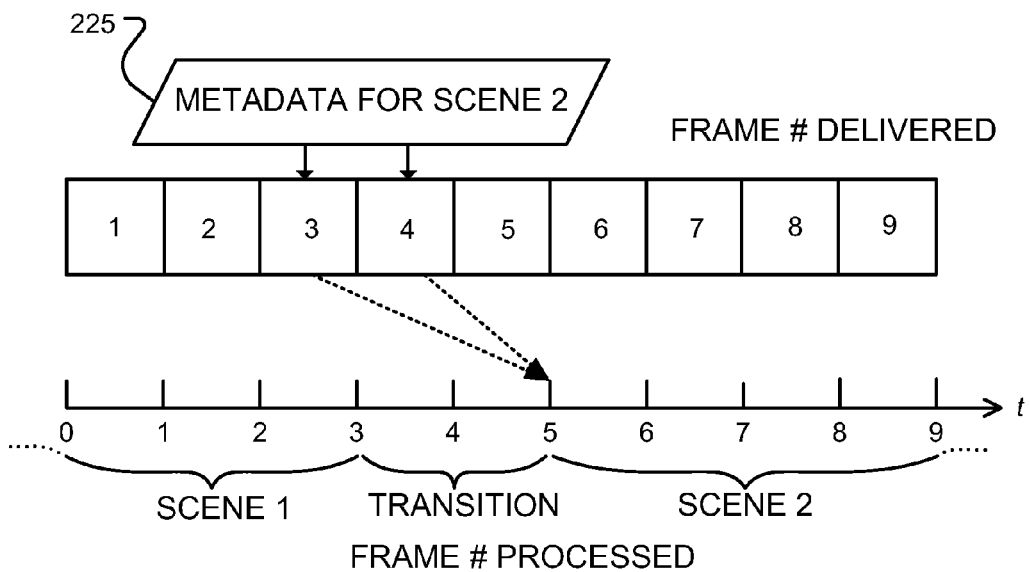
FIG. 8 illustrates the delivery of a sequence of video frames including metadata for a particular scene, and a timeline showing when the video frames are processed relative to the delivery of metadata.

FIG. 8 shows metadata 225 that is carried through a video delivery pipeline and received by a downstream device (e.g. video processor, decoder and/or display) in advance of the time at which the metadata is processed and applied. In the illustrated example, a new scene in the video commences at video frame #5 and video frames #3 and #4 carry metadata which may be applied to such scene. As such, by the time that the downstream device receives and begins to process the video data for the new scene commencing at video frame #5, the downstream device has already received the metadata (carried within video frames #3 and #4) for application to such scene. Application of the metadata may be triggered upon detecting the start of a new scene at video frame #5. Video frames #3 and #4 may be black, transitional frames having pixels for which luminance values are driven to zero. Chrominance data in video frames #3 and #4 may be overwritten with metadata without substantially affecting the appearance of the black video frames during video playback.

Figure 5A:
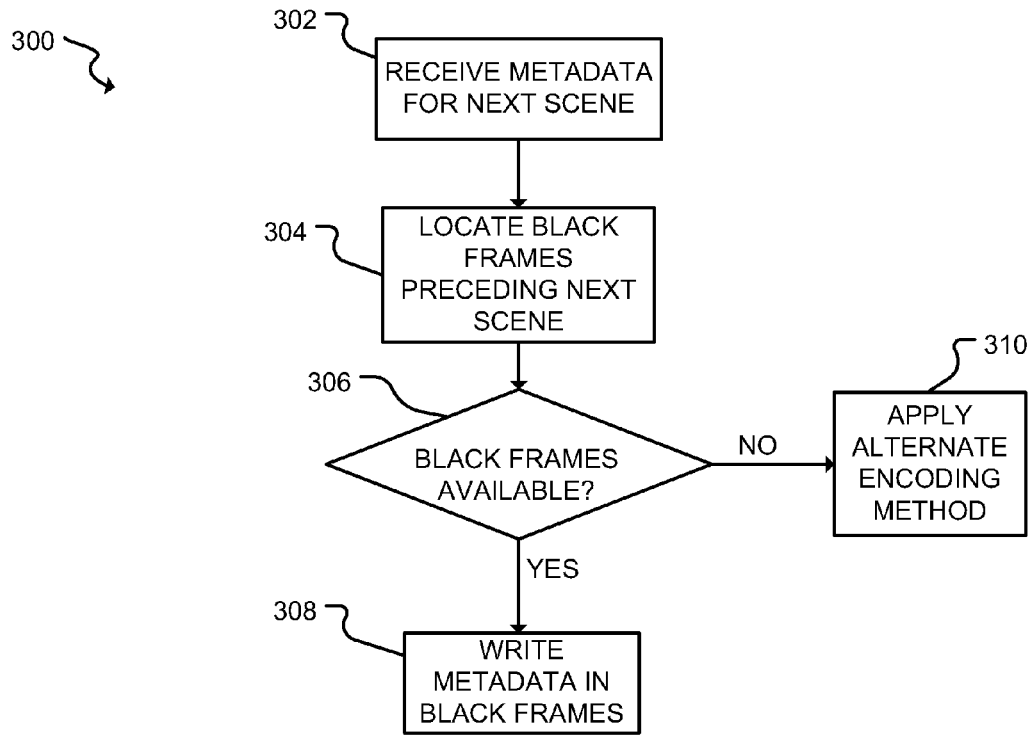
FIGS. 5A, 5B and 5C are flowcharts illustrating methods of encoding metadata in video data according to particular embodiments.
Figure 5B:
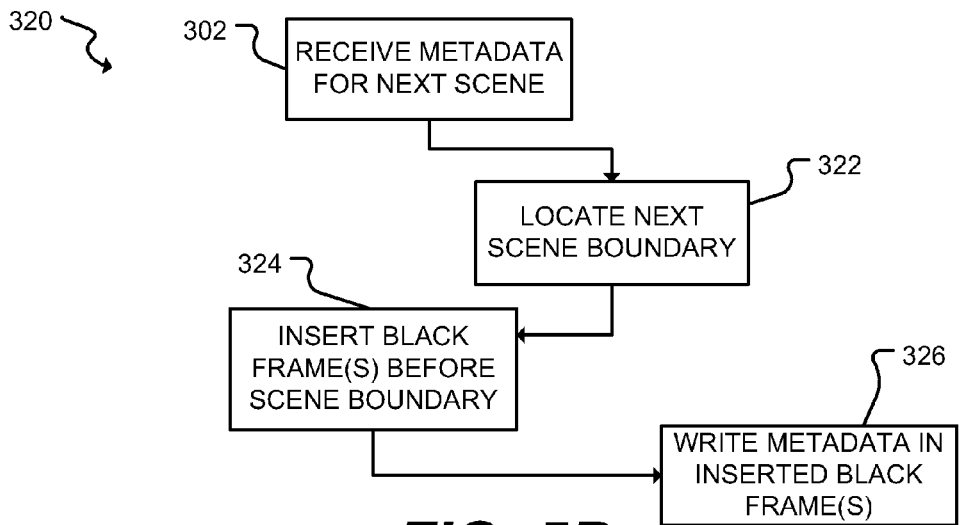
Figure 5C:
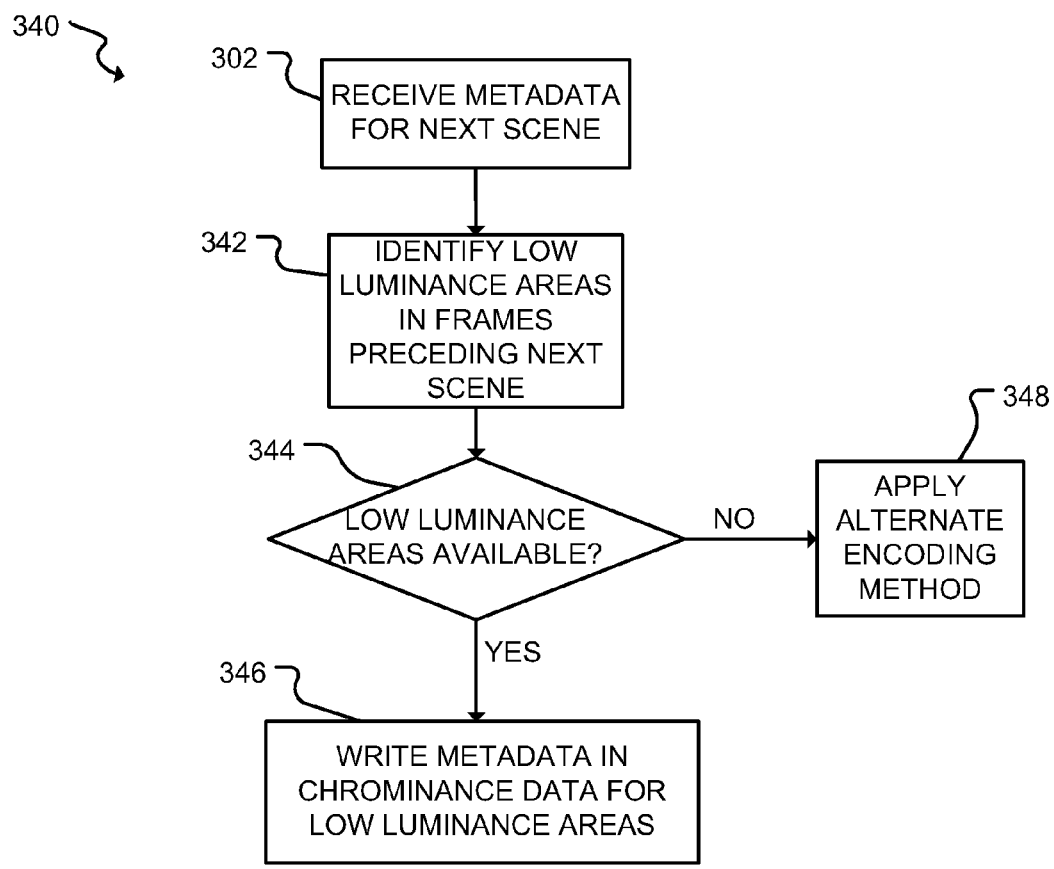
Figure 6:
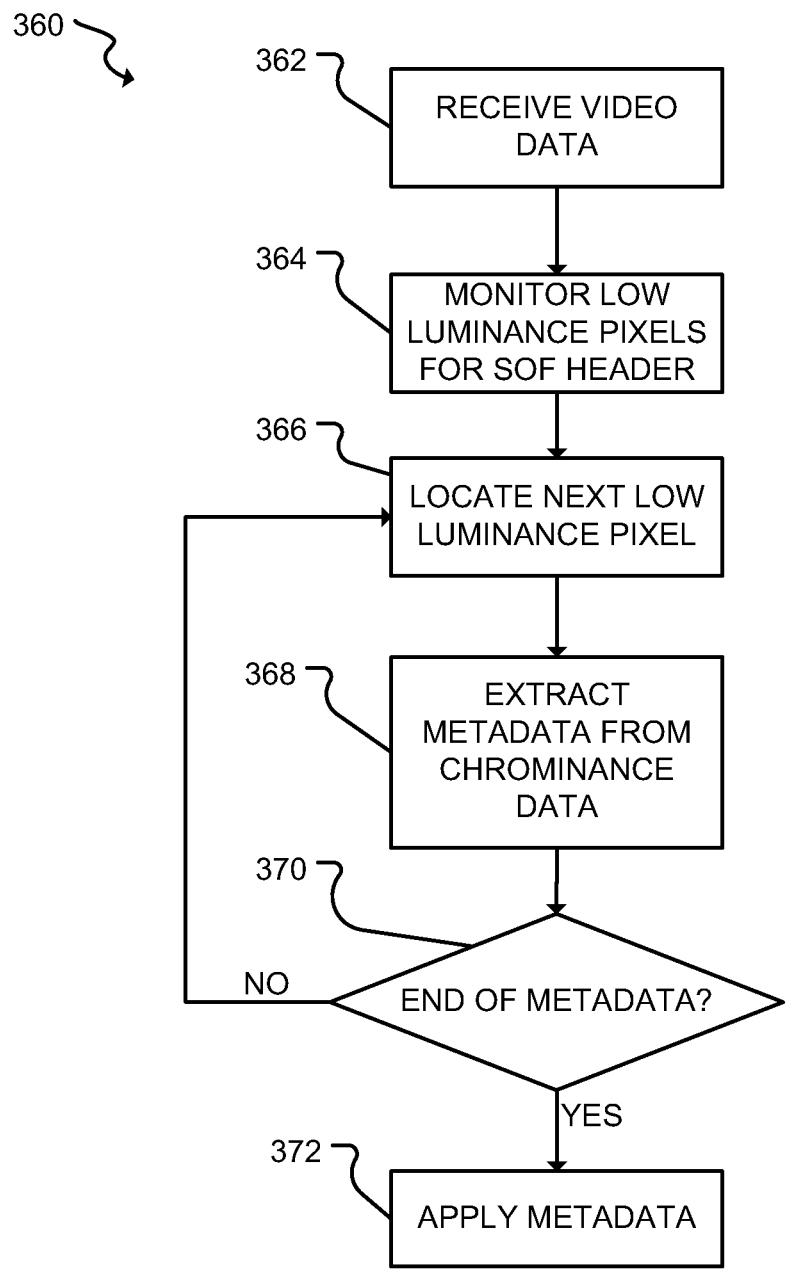
FIG. 6 is a flowchart illustrating a method according to one embodiment of decoding metadata that has been encoded in video data using the method of FIG. 5A, 5B or 5C.

One or more of the methods illustrated in FIGS. 5A, 5B and 5C may be used to encode metadata in video data. The methods of FIGS. 5A, 5B and 5C may be applied to write metadata in chrominance portions of video data which is encoded in a video format for which chrominance data is represented separately from luminance data. Video data encoded according to the following color spaces have a separate chrominance component, for example: LUV, YCbCr, YUV, YCC, HLS, HSV, CIELAB, etc. The methods of FIGS. 5A, 5B and 5C may be used to deliver metadata which is subsequently applied, by a downstream device in the video delivery pipeline, to process video data and/or configure a display for a particular scene or sequence of frames. The method illustrated in FIG. 5D may be used to extract, from the video data, metadata which has been encoded using one of the methods of FIG. 5A, 5B or 5C.

FIG. 5A shows a method 300 of encoding metadata in black video frames. Method 300 begins by receiving at block 302 metadata for the next scene to be displayed (or other sequence of frames). Method 300 proceeds to block 304 by locating black video frames preceding the next scene. If it is determined at block 306 that black video frames are available to carry the block 302 metadata, the metadata is written in the black video frames at block 308. The metadata may be written in the chrominance portions of the video data representing such video frames (see FIGS. 3A and 3B, for example, showing data frames 10 having chrominance portions 13 overwritten with metadata 225). Otherwise, if no black video frames are available, method 300 proceeds by applying another method of encoding metadata at block 310. Block 310 of method 300 may apply one of the methods shown in FIG. 5B or 5C, or another method (e.g. such as the method of encoding metadata in chrominance portions of video data representing the mattes or black bars 80 appearing in certain video formats). For example, during television broadcasts, commercials may be displayed in a pillar box or letter box format; accordingly, metadata for scenes following a commercial broadcast may be inserted in the chrominance portions of the pillar box/letter box black image areas of the commercial portion of the broadcast. The metadata may include a timestamp identifying when the metadata is to be applied.

FIG. 5B shows a method 320 of encoding metadata according to another embodiment. Method 320 may be applied at block 310 of method 300 if it is determined at block 306 of method 300 that no black video frames preceding the next scene are available to carry metadata. Method 320 begins by receiving metadata for the next scene or other sequence of frames at block 302. Method 320 proceeds to block 322 by locating the boundary between the present scene and the next scene. At block 324, one or more black video frames are inserted in the video data at the scene boundary (i.e. the black video frames are inserted between the last frame of the present scene and the first frame of the next scene). The black video frames may be inserted for the purpose of carrying metadata for the next scene. At block 326, metadata may be written in the inserted black video frames. Metadata may be written in the chrominance portions of video data representing such video frames (see FIGS. 3A and 3B, for example, showing data frames 10 having chrominance portions 13 overwritten with metadata 225).

FIG. 5C shows a method 340 of encoding metadata according to yet another embodiment. Method 340 may be applied at block 310 of method 300 if it is determined at block 306 of method 300 that no black video frames preceding the next scene are available in the video data for carrying metadata. Method 340 begins by receiving metadata for the next scene or other sequence of frames at block 302. At block 342, low luminance image areas are identified in the frames preceding the next scene. An image area may be considered a low luminance image area if luminance levels for the image area's pixels are driven to zero or below a certain threshold value. If at block 344 it is determined that the available low luminance image areas provide sufficient bandwidth in the chrominance portions of the video data to carry the block 302 metadata, at block 346 metadata is written in the chrominance portions of the video data representing such image areas. If however there is insufficient bandwidth available in any low luminance image areas (or if no low luminance image areas are available), method 340 proceeds by applying another method of encoding metadata at block 348. For example, method 320 shown in FIG. 5B may be applied at block 348 of method 340 to encode metadata in black frames which are inserted at the scene boundary for the purpose of carrying metadata.

FIG. 5D shows a method 360 of extracting metadata from video data and subsequently applying the metadata, where the metadata has been encoded using one of the methods in FIG. 5A, 5B or 5C. Method 360 begins by receiving a stream of video data at block 362. At block 364, method 360 monitors chrominance portions for pixels for which luminance levels are driven to zero or below a threshold value (a low luminance pixel), to detect an SOF header 252 or other reserved metadata word defining the start of a metadata packet. After the start of a metadata packet has been detected at block 364, method 360 proceeds to block 366 by locating the next low luminance pixel in the video data stream. At block 368, metadata is extracted from the chrominance portions of the pixel data for the low luminance pixel. If the end of the metadata payload has not yet been reached (block 370) method 360 repeats the steps at blocks 366, 368 and 370 (i.e. locating the next low luminance pixel in the video data stream and extracting metadata from the chrominance portions of the pixel data), until the end of the metadata payload is reached. At block 372, the metadata may be applied to process the video data and/or configure the display for video playback.

In some embodiments, the encoded metadata may be preceded by a first metadata packet. The first metadata packet may be encoded in the video data according to a pre-selected method known to each downstream apparatus which encodes or decodes metadata. This first metadata packet contains information about how the subsequent metadata is encoded (e.g. which method of encoding is used). The information may indicate that the remainder of the video frame is carrying metadata in the chrominance portions of the video data, such as may be the case for black video frames. The information may indicate that only a portion of the video frame is carrying metadata in the chrominance portions of the video data, such as may be the case for video frames having black mattes or low luminance image areas. The information may indicate where such metadata is located in the video frame. A downstream apparatus may use the information in the first metadata packet to guide the decoding or extraction of metadata from the video data. A downstream apparatus may use the information in the first metadata packet to guide insertion or encoding of additional metadata in the video data stream.

In some embodiments, a black video frame may be inserted within a scene for the purpose of carrying metadata. Metadata may be written in the chrominance portions of video data for the black video frame. At the display end (block 210 of FIG. 4), video playback may include repeating playback of the video frame preceding the black video frame. The repetition of the preceding video frame ensures that luminance of the scene remains constant, which may reduce flicker.

According to particular embodiments, metadata is encoded in video data in such a way so as to avoid inadvertently communicating a reserved or protected word or sequence of bits (which may be any number of bits long). There may be two types of reserved words: reserved metadata words as may be communicated by the metadata, and reserved video words as may be communicated by the video data stream. The metadata may be encoded so that the metadata avoids matching a reserved metadata word, such as a packet start of frame (SOF) header 252 or end of frame (EOF) header 260 (FIG. 7). The metadata may be encoded so that the metadata avoids matching a reserved video word (e.g. reserved pixel values). Reserved pixel values may include, for example, one or more of 0, 255 and other reserved values.

Encoding methods which may be used to avoid unintended communication of reserved metadata words and/or reserved video words may include, for example:
- 6b/8b encoding (wherein the longest permitted run of consecutive identical bits is 6 bits long).
- 8b/10b encoding (wherein the longest permitted run of consecutive identical bits is 5 bits long).
- Defining a fixed pattern of consecutive identical bits to represent reserved metadata words such as SOF header 252 or EOF header 260, and avoiding encoding the fixed patterns during embedding of the metadata payload in the video data. For example, if the fixed patterns are the six bit long patterns 000000 and 111111, whenever the five bit long pattern 00000 or 11111 appears in the metadata payload, a 1 or 0 guard bit is embedded as the next bit in the video data stream (e.g. 000001 or 111110). During extraction of metadata from the video data stream, this guard bit is not considered valid and is disregarded.

Other kinds of data (other than metadata) may be written in the video data, such as by overwriting the chrominance component of such video data. The methods described herein may be used in combination with methods of embedding metadata in other data channels such as encoding metadata in guard bits or least significant bits. Encoding of metadata in guard bits or least significant bits is described in a co-owned, co-pending application entitled SYSTEMS, APPARATUS AND METHODS FOR VIDEO DELIVERY AND CONTROLLING VIDEO DISPLAY USING EMBEDDED METADATA, which is incorporated herein by reference.

Video processing may include spatial and/or temporal filtering of video data. Downstream apparatus which perform such filtering may be configured to ignore the data in the chrominance portions (or other metadata-carrying portions of video data), or to extract the metadata from the chrominance portions and to replace the data in the chrominance portions with surrounding chroma values. In embodiments in which metadata is carried within non-black image areas (e.g. image areas having low luminance values) the metadata may be inserted in a defined border around the edge of the video image, in which overwriting of chrominance data with metadata is less likely to cause a perceivable effect on the display of the image.

To ensure that lossy video data compression does not result in loss of metadata carried in the chrominance portions of the video data, values for the corresponding luminance portions may be set to a predefined value to flag the presence of metadata in the chrominance portions and prevent loss of video data. A downstream apparatus may be configured to extract the metadata from the chrominance portions, and replace the set luminance values with a black luminance value for video playback. In other embodiments, to avoid metadata loss through lossy video data compression, metadata is not written in the least significant bits of the chroma channel (e.g. the two or three least significant bits are not used for carrying metadata) so that if such least significant bits are lost through compression, the metadata is not also lost.

Figure 9:
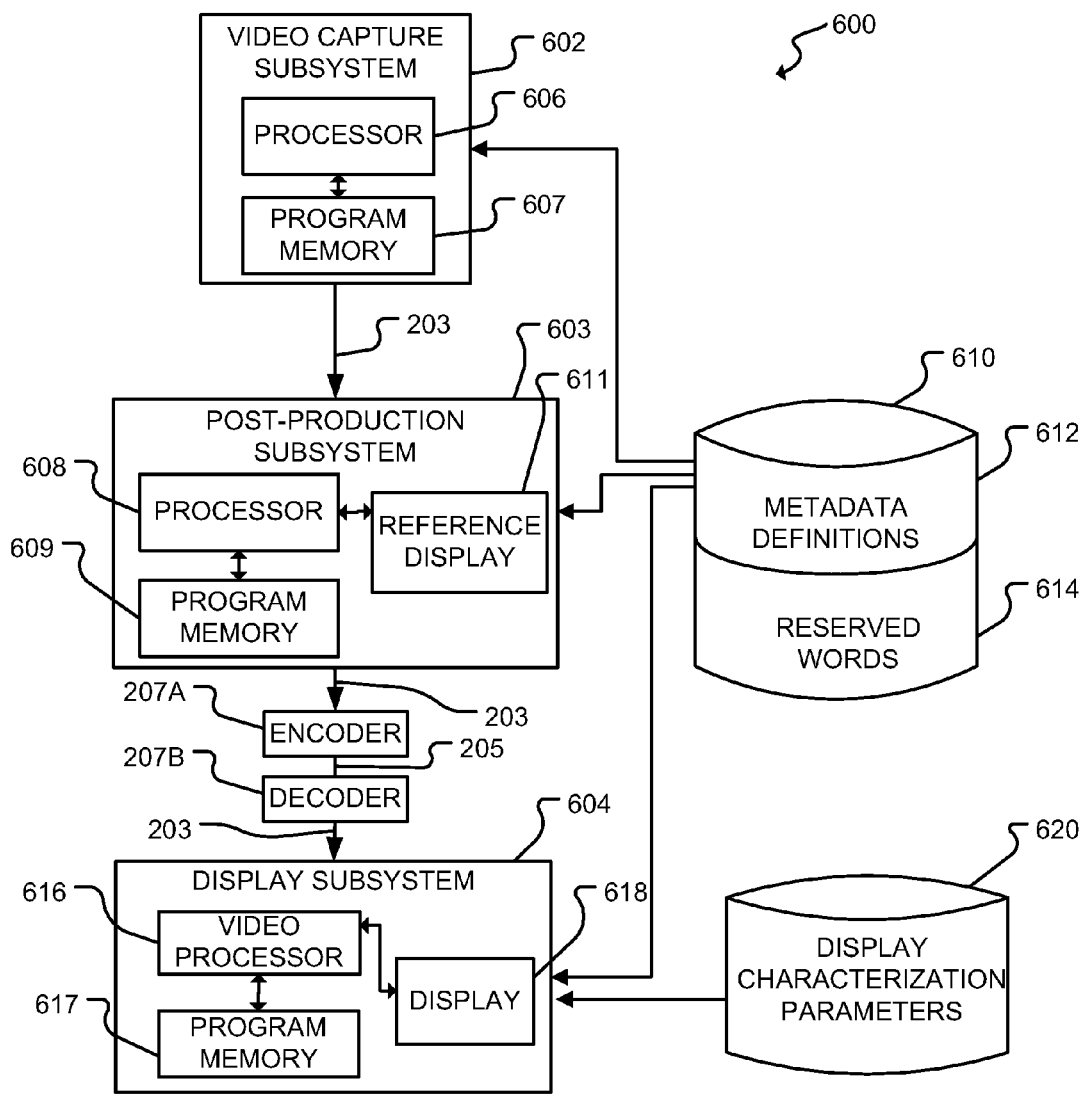
FIG. 9 schematically depicts a system according to one embodiment which may be used to implement one or more of the methods described herein.

FIG. 9 shows a system 600 according to one embodiment that may be configured to perform one or more of the methods described herein. Components of system 600 may be implemented as software, hardware and/or a combination thereof. System 600 includes a video capture subsystem 602, a post-production subsystem 603 and a display subsystem 604. A stream of video data 203 is generated by video capture subsystem 602 and is delivered to post-production subsystem 603 for processing and editing. Video images may be displayed and viewed on a reference display 111 of post-production subsystem 603 in the course of editing the video data 203. The edited video data 203 is delivered to display subsystem 604 (over a distribution medium 205 by way of encoder 207A and decoder 207B) for further processing and display. Each of subsystems 602, 603 and 604 (and encoder 207A) may be configured to encode metadata 225 in video data 203. Downstream subsystems may be configured to receive video data 203 from an upstream device and decode the metadata 225 which has been embedded therein. Metadata 225 may be used by downstream subsystems (e.g. subsystems 603 and 604) to guide processing and/or display of video data 203. Metadata 225 may be used by display subsystem 604 along with display characterization parameters 620 to control and/or guide video playback on a display 618 of display subsystem 604.

As seen in FIG. 9, subsystems 602, 603 and 604 may comprise a processor 606, 608 and 616 respectively, and a program memory 607, 609 and 617 accessible to the respective processors. Each processor may comprise a central processing unit (CPUs), one or more microprocessors, one or more field programmable gate arrays (FPGAs), or any combination thereof, or any other suitable processing unit(s) comprising hardware and/or software capable of functioning as described herein. In each subsystem the processor executes instructions provided by software stored in the program memory. The software may include routines to perform the metadata generation, encoding, decoding and processing steps described herein, such as, for example, routines which:
  generate metadata 225 or receive parameters for metadata 225 (e.g. such parameters may be set by color timers or color graders at the post-production stage; metadata 225 may define certain parameters as described herein with reference to FIG. 4);
  encode metadata 225 in video data 203 before such video data is communicated to a downstream device;
  decode metadata 225 from video data 203 received from an upstream device;
  process and apply metadata 225 to guide processing and/or display of video data;
  select a method for encoding metadata 225, based on the image and/or video data 203 (e.g. the method of encoding metadata 225 may be selected based on availability of black frames, black bars or mattes and/or low luminance image areas);
  locate black video frames in the video data, or locate black or low luminance pixels in the video frames;

and/or the like.

System 600 may include a repository 610 accessible to subsystems 602, 603 and 604. Repository 610 may include a library of metadata definitions 612 (e.g. which informs the metadata encoders and decoders as to how to generate and/or read the metadata) and a list of reserved words 614 (e.g. protected pixel values or reserved metadata words). The library of metadata definitions 612 may be accessed by subsystems 602, 603 and 604 in generating, encoding and/or processing metadata. In encoding or decoding metadata 225, reserved words 614 may be compared to encoded/decoded metadata bits to identify sequences of guard bits to insert (or that were inserted) in the metadata stream to prevent communication of a reserved word.

While a shared repository 610 is shown in the illustrated embodiment of FIG. 9, in other embodiments each of subsystems 602, 603 and 604 may incorporate a local repository 610 stored in a storage medium accessible to that subsystem.

Figure 10A:
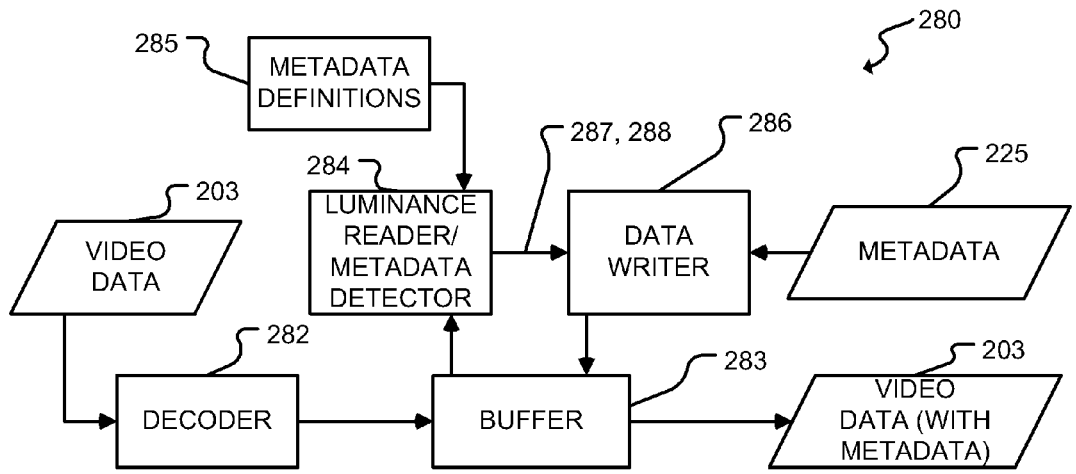
FIG. 10A schematically depicts a subsystem according to one embodiment that may be used to encode metadata in video data.

FIG. 10A shows a subsystem 280 that may be used to encode metadata in a stream of video data according to an example embodiment. Subsystem 280 may be used to encode metadata 225 relating to an upcoming scene or other sequence of frames, using one of the methods shown in FIG. 5A, 5B or 5C, for example, or another method described herein. Subsystem 280 may receive input video data 203 from a source of video data. In some embodiments, subsystem 280 may retrieve input video data 203 from a buffer or other storage media. In other embodiments, subsystem 280 may receive streaming video data 203 from a video signal input. Video data 203 may be provided in a format suitable for the type of video content delivery, such as television broadcast over satellite, cable, or high-definition networks; streaming multimedia over IP or wireless networks; or reading a DVD or other storage media, or the like.

Input video data 203 may include embedded metadata which was added to the video data by an upstream apparatus. According to some embodiments, input video data 203 may include luminance and chrominance information. In particular embodiments, video data 203 is decoded by a decoder 282. Decoder 282 may separate the luminance and chrominance components in the video signal.

Video data 203 for the upcoming scene or sequence of frames may be pushed into one or more data buffers 283 implemented by software and/or hardware. One or more frames of video data 203 (or other portion of video data 203) may be pushed into buffer 283, in succession, as video data 203 is received. A luminance reader 284 may access the video data 203 stored in buffer 283 and read the luminance data to evaluate the luminance levels for video frames, image areas or pixels in the video data. Luminance reader 284 may compare luminance levels to a threshold value. Luminance reader 284 may identify video frames, image areas or pixels for which the luminance levels are zero or below a threshold value (e.g. black video frames as located at block 304 of FIG. 5A, or low luminance image areas as located at block 342 of FIG. 5C). Luminance reader 284 may map out the luminance levels for a video frame, or determine whether video data represents a black video frame or black image area, in one of a number of ways, for example: evaluating the luminance level for each pixel in a video frame, evaluating luminance levels for pixels in selected regions of a video frame; evaluating luminance levels for sample pixels or regions; and/or the like. For the identified video frames, image areas or pixels, luminance reader 284 may compare the data in the chrominance portions with reserved metadata words (e.g. start of frame header) to identify whether metadata has already been written in such chrominance portions. Luminance reader 284 may access metadata words from a metadata definitions store 285 and compare such metadata words to data in the chrominance portions, to detect the presence of metadata.

If the luminance levels are zero or below a threshold value and no metadata is already embedded in the chrominance data, luminance reader 284 may send a signal 287 to data writer 286 communicating that metadata 225 (or other data) may be written in the chrominance portions for the identified video frames, image areas or pixels (as discussed in respect of block 308 of FIG. 5A or block 346 of FIG. 5C, for example). Luminance reader 284 may continue to access and read video data 203 in buffer 283 until it locates black (or low luminance) video frames, image areas or pixels having chrominance portions that do not contain metadata.

When data writer 286 receives signal 287, data writer 286 retrieves metadata 225 relating to an upcoming scene and writes metadata 225 in the chrominance portions of video frames, image areas or pixels determined by luminance reader 284 to be suitable for carrying metadata. Data writer 286 may retrieve metadata 225 from a store or buffer containing metadata. After data writer 286 has overwritten the chrominance data of video data 203 with metadata 225, subsystem 280 outputs video data 203 including the inserted metadata 225 (e.g. video data 203 may be pushed out from buffer 283 and new incoming frames of video data 203 are pushed into buffer 283). Output video data 203 may be delivered to a downstream apparatus such as a display subsystem for processing and/or video playback.

If luminance reader 284 does not identify any suitable video frames, image areas or pixels for carrying metadata, luminance reader 284 may communicate a signal 288 to data writer 286 causing data writer 286 to insert black video frames in video data 203 for the purpose of carrying metadata 225 (as discussed with reference to blocks 322 and 324 of FIG. 5B, for example). Luminance reader 284 may signal to data writer 286 when or where to insert the black video frames. For example, black video frames containing metadata in the chrominance portions may be inserted at a scene boundary, as discussed with respect to block 326 of FIG. 5B.

Figure 10B:
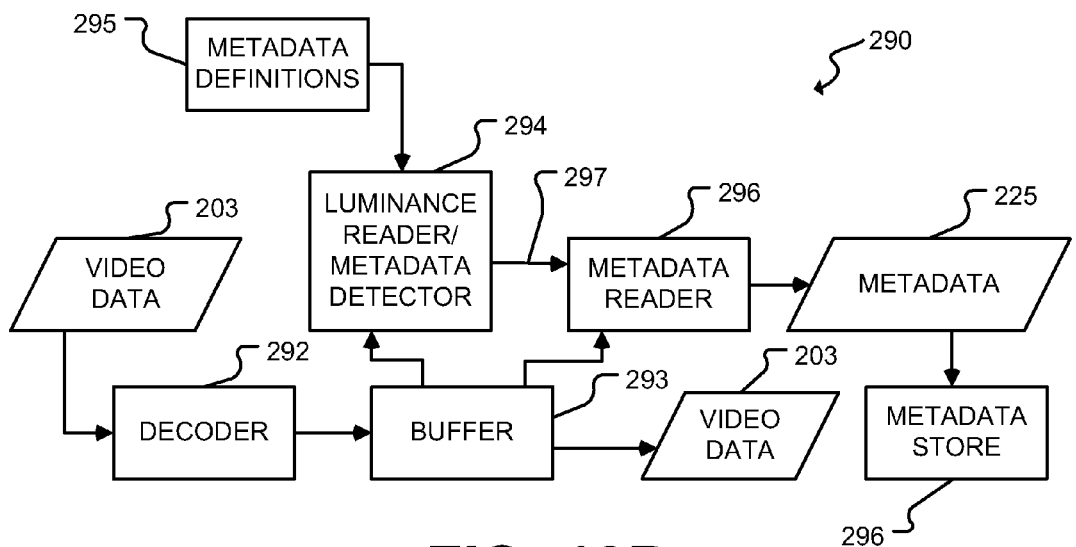
FIG. 10B schematically depicts a subsystem according to one embodiment that may be used to extract metadata from video data.

FIG. 10B shows a subsystem 290 that may be used to decode metadata from a stream of video data according to an example embodiment. Subsystem 290 may be used to extract metadata 225 for an upcoming scene, using one of the methods described herein, such as, for example, method 360 of FIG. 5D. Subsystem 290 is similar in some respects to subsystem 280. For example, subsystem 290 receives input video data 203, and may decode input video data 203 at a decoder 292 (similarly to how subsystem 280 receives and decodes input video data 203). Input video data 203 may be buffered in a buffer 293. A luminance reader 294 accesses the video data 203 stored in buffer 293 and reads the luminance data to evaluate the luminance levels for video frames, image areas or pixels in the video data. Luminance reader 294 may compare luminance levels to a threshold value. Luminance reader 294 may identify video frames, image areas or pixels for which the luminance levels are zero or below a threshold value. For the identified video frames, image areas or pixels, luminance reader 294 may compare the data in the chrominance portions with reserved metadata words (e.g. start of frame header) to identify whether metadata has been written in such chrominance portions. Luminance reader 294 may access metadata words from a metadata definitions store 295 and compare such metadata words to data in the chrominance portions, to detect the presence of metadata.

If metadata has been written in the chrominance portions for video frames, image areas or pixels, luminance reader 294 may send a signal 297 to a metadata reader 296 causing metadata reader 296 to access video data 203 in buffer 293 and read the metadata 225 (or other data) from the chrominance portions (as performed at block 368 of FIG. 5D, for example). Metadata 225 may be stored in a metadata store 296 for subsequent retrieval and application.

In other embodiments, luminance readers 284, 294 may not read the luminance data to determine whether and where to write or extract metadata. When metadata is written in video data, a metadata packet may be generated by the metadata writer and inserted in the video data stream, indicating to downstream apparatus where to locate existing metadata in the video data (e.g. in certain video frames, or commencing at a particular pixel in a video frame, or in particular image areas, etc.) This metadata packet may be used by subsystem 280 to guide writing of additional metadata in the video data and may be used by subsystem 290 to guide extraction of metadata from the video data.

Luminance readers 284, 294 may be implemented by a data processor, CPU, microprocessor, FPGA, or any combination thereof, or any other suitable processing unit capable of reading video data to determine luminance levels and comparing such luminance levels to a threshold value. Data writer 286 and metadata reader 296 may be implemented by a data processor, CPU, microprocessor, FPGA, or any combination thereof, or any other suitable processing unit capable of accessing video data 203 from a video data source and writing or reading bits of video data 203.

Where a component (e.g. processor, decoder, encoder, device, display, buffer, circuit, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which perform the function in the illustrated exemplary embodiments of the invention.

Particular embodiments may be provided in the form of a program product. The program product may comprise any medium which carries a set of computer-readable signals comprising instructions which, when executed by a data processor, cause the data processor to execute a method of the invention. Program products according to the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

While a number of exemplary aspects and embodiments have been discussed above, those of skill in the art will recognize certain modifications, permutations, additions and sub-combinations thereof. For example:

The example embodiments described herein provide for systems, apparatus and methods useful in a video delivery pipeline. Such systems, apparatus and methods may be useful for delivery of other types of data.

In example embodiments, metadata is written in video data and transmitted with the video data through the video delivery pipeline. In other embodiments, other kinds of data may be written in video data and transmitted with the video data through the video delivery pipeline. For example, additional video data that may be transmitted may include: additional video source content such as video data in a different resolution (e.g. higher or lower resolution video data); on screen display information;

and/or a URL or IP address for identifying the location of additional sources of video data that may be retrieved by an IP-enabled TV or set-top box; and the like.

Metadata written in video data according to the embodiments described herein may be useful in guiding configuration, control and/or operation of other apparatus such as a video archiver, recorder (e.g. Personal Video Recorder or PVR, or digital tuner having recording capability), etc. For example, a recorder may pre-process the video data to remove inserted frames containing metadata, to reduce the amount of video data that is stored.

It is therefore intended that the following appended claims and claims hereafter introduced are interpreted to include all such modifications, permutations, additions and sub-combinations as are within their true spirit and scope.

Accordingly the invention may suitably comprise, consist of, or consist essentially of, any of element (the various parts or features of the invention and their equivalents as described herein, currently existing, and/or as subsequently developed. Further, the present invention illustratively disclosed herein may be practiced in the absence of any element, whether or not specifically disclosed herein. Obviously, numerous modifications and variations of the present invention are possible in light of the above teachings. It is therefore to be understood that within the scope of the appended claims, the invention may be practiced otherwise than as specifically described herein.

Accordingly, the invention may be embodied in any of the forms described herein, including, but not limited to the following Enumerated Example Embodiments (EEEs) which described structure, features, and functionality of some portions of the present invention.

EEE1. A method of providing video data to a display subsystem, comprising:
  (a) capturing a sequence of video frames to provide video data;
  (b) editing on a reference display an image provided by the video data;
  (c) generating metadata identifying configuration parameters of the reference display and characteristics of the edited image;
  (d) embedding the metadata in one or more chrominance portions of the video data;
  (e) delivering the video data including the embedded metadata to the display subsystem;
  (f) extracting the metadata at the display subsystem; and
  (g) configuring the display subsystem or processing the video data for the display subsystem based at least in part on the metadata.

EEE2. A method according to EEE 1, wherein embedding the metadata in the chrominance portions comprises embedding the metadata in the chrominance portions of pixels for which luminance values are below a threshold value.

EEE3. A method according to EEE 2, wherein embedding the metadata in the chrominance portions comprises:
  (a) locating black video frames in the video data; and
  (b) embedding the metadata in the chrominance portions of pixels in the black video frames.

EEE4. A method according to EEE 3, wherein the metadata corresponds to a new scene, and locating black video frames in the video data comprises locating black video frames preceding the new scene.

EEE5. A method according to EEE 2, wherein embedding the metadata in the chrominance portions comprises:
  (a) locating black mattes framing an image in the video data; and
  (b) embedding the metadata in the chrominance portions of pixels in the black mattes.

EEE6. A method according to EEE 2, wherein embedding the metadata in the chrominance portions comprises:
  (a) locating video frames in the video data having image areas for which luminance values are below the threshold value; and
  (b) embedding the metadata in the chrominance portions of pixels in the image areas.

EEE7. A method according to EEE 1, wherein the metadata corresponds to a new scene, the method comprising:
  (a) locating in the video data a boundary between the new scene and a preceding scene;
  (b) inserting one or more black video frames at the boundary; and
  (c) embedding the metadata in the chrominance portions of pixels in the black video frames.

EEE8. A method according to any one of EEEs 1 to 7, wherein delivering the video data comprises delivering the video data with the embedded metadata in advance of a video frame for which the embedded metadata is to be applied.

EEE9. A method according to any one of EEEs 1 to 8, wherein delivering the video data comprises delivery by one of the following transmission media: DVD, Blu-ray, satellite, cable or Internet.

EEE10. A method according to any one of EEEs 1 to 9, wherein the metadata is encoded in one of the following formats:
  (a) 6b/8b encoding; and
  (b) 8b/10b encoding.

EEE11. A method according to any one of EEEs 1 to 10, wherein the metadata is encoded so that a start of frame header in the metadata is represented by a first fixed pattern of consecutive identical bits and an end of frame header in the metadata is represented by a second fixed pattern of consecutive identical bits.

EEE12. A system comprising:
  (a) a video capture subsystem for generating video data;
  (b) a post-production subsystem having a reference display and a processor configured to receive and edit the video data generated by the video capture subsystem and display the video data on the reference display; and
  (c) a display subsystem having a display and a video processor configured to receive the video data edited by the post-production subsystem and display the video data on the display;
  wherein at least one of the video capture subsystem, post-production subsystem and display subsystem is configured to encode metadata in the video data by embedding metadata in one or more chrominance portions of the video data, and the display subsystem is configured to apply the metadata for guiding processing or display of the video data.

EEE13. A system according to EEE 12, wherein the at least one of the video capture subsystem, post-production subsystem and display subsystem is configured to encode metadata in the video data by embedding the metadata in the chrominance portions of pixels for which luminance values are below a threshold value.

EEE14. A system according to EEE 13, wherein the at least one of the video capture subsystem, post-production subsystem and display subsystem is configured to:
  (a) locate black video frames in the video data; and
  (b) embed the metadata in chrominance portions of pixels in the black video frames.

EEE15. A system according to EEE 13, wherein the at least one of the video capture subsystem, post-production subsystem and display subsystem is configured to:
(a) locate black mattes framing an image in the video data; and
(b) embed the metadata in the chrominance portions of pixels in the black mattes.

EEE16. A system according to EEE 13, wherein the at least one of the video capture subsystem, post-production subsystem and display subsystem is configured to:
(a) locate video frames in the video data having image areas for which luminance values are below the threshold value; and
(b) embed the metadata in the chrominance portions of pixels in the image areas.

EEE17. A system according to EEE 13, wherein the metadata corresponds to a new scene and the post-production subsystem is configured to:
(a) locate in the video data a boundary between the new scene and a preceding scene;
(b) insert one or more black video frames at the boundary; and
(c) embed the metadata in the chrominance portions of pixels in the black video frames.

EEE18. A system according to EEE 12, wherein the at least one of the video capture subsystem, post-production subsystem and display subsystem is configured to encode metadata in one of the following formats:
(a) 6b/8b encoding; and
(b) 8b/10b encoding.

EEE19. A system according to EEE 12, wherein the at least one of the video capture subsystem, post-production subsystem and display subsystem is configured to encode metadata so that a start of frame header in the metadata is represented by a first fixed pattern of consecutive identical bits and an end of frame header in the metadata is represented by a second fixed pattern of consecutive identical bits.

EEE20. A system according to EEE 12, wherein the processor of the post-production subsystem is configured to encode metadata in the video data identifying at least one of: configuration parameters of the reference display; and color and lighting characteristics of an image provided by the video data.

EEE21. A system according to EEE 20, wherein the video processor of the display subsystem is configured to decode metadata in the video data and apply the decoded metadata to configure the display of the display subsystem or process the video data to adjust for characteristics of the display of the display subsystem.

EEE22. A system according to EEE 21, wherein the video processor of the display subsystem is configured to read the Extended Display Identification Data of the display of the display subsystem to process the video data to adjust for characteristics of the display of the display subsystem.

EEE23. A system according to any one of EEEs 12 to 22, wherein the display subsystem is configured to receive video data by way of at least one of the following transmission media: DVD, Blu-ray, satellite, cable or Internet.

EEE24. A method of encoding metadata in video data, the method comprising:
(a) retrieving metadata to be carried in the video data;
(b) locating pixels in the video data which have a luminance value below a threshold value; and,
(d) overwriting the chrominance data for the pixels with the metadata.

EEE25. A method according to EEE 24, comprising:
(a) locating black video frames in the video data; and
(b) overwriting the chrominance data for the black video frames with the metadata.

EEE26. A method according to EEE 24, comprising:
(a) locating black mattes framing an image in the video data; and
(b) overwriting the chrominance data for the black mattes with the metadata.

EEE27. A method according to EEE 24, wherein the metadata corresponds to a new scene, the method comprising:
(a) locating in the video data a boundary between the new scene and a preceding scene;
(b) inserting one or more black video frames at the boundary; and
(c) overwriting the chrominance data for the black video frames with the metadata.

EEE.28. A method according to any one of EEEs 24 to 27, wherein the metadata is encoded in one of the following formats:
(a) 6b/8b encoding; and
(b) 8b/10b encoding.

EEE29. A method according to any one of EEEs 24 to 28, wherein the metadata is encoded so that a start of frame header in the metadata is represented by a first fixed pattern of consecutive identical bits and an end of frame header in the metadata is represented by a second fixed pattern of consecutive identical bits.

EEE30. A method of extracting metadata from video data, comprising:
(a) identifying pixels in the video data which have a luminance value below a threshold value;
(b) monitoring chrominance portions of the pixels for a beginning of a metadata packet; and
(c) extracting metadata from the chrominance portions after the beginning of a metadata packet is located.

EEE31. A method comprising any new and inventive act, step, combination of acts and/or steps or sub-combination of acts and/or steps described herein.

EEE32 An apparatus comprising any new and inventive feature, combination of features or sub-combination of features described herein.

The invention claimed is:

1. A method of providing video data to a display subsystem, comprising:
capturing a sequence of video frames to provide video data;
editing on a reference display an image provided by the video data;
generating metadata identifying configuration parameters of the reference display and characteristics of the edited image, wherein the metadata corresponds to a new scene in the video data and wherein the metadata is capable of controlling the display subsystem according to a director's creative intent for displaying the video data;
locating black video frames in the video data preceding the new scene;
embedding the metadata in one or more chrominance portions of pixels in the black video frames, if available;
if not available, embedding the metadata in alternative portions of the video data;
delivering the video data including the embedded metadata to the display subsystem;
extracting the metadata at the display subsystem; and
configuring the display subsystem or processing the video data for the display subsystem based at least in part on the metadata.

2. A method according to claim 1, wherein embedding the metadata in the chrominance portions comprises embedding the metadata in the chrominance portions of pixels for which luminance values are below a threshold value.

3. A method according to claim 2, wherein embedding the metadata in the chrominance portions comprises:
(a) locating black mattes framing an image in the video data; and
(b) embedding the metadata in the chrominance portions of pixels in the black mattes.

4. A method according to claim 2, wherein embedding the metadata in the chrominance portions comprises:
(a) locating video frames in the video data having image areas for which luminance values are below the threshold value; and
(b) embedding the metadata in the chrominance portions of pixels in the image areas.

5. A method according to claim 1, wherein the metadata corresponds to a new scene, the method comprising:
(a) locating in the video data a boundary between the new scene and a preceding scene;
(b) inserting one or more black video frames at the boundary; and
(c) embedding the metadata in the chrominance portions of pixels in the black video frames.

6. A method according to claim 1, wherein delivering the video data comprises delivering the video data with the embedded metadata in advance of a video frame for which the embedded metadata is to be applied.

7. A method according to claim 1, wherein delivering the video data comprises delivery by one of the following transmission media: DVD, Blu-ray, satellite, cable or Internet.

8. A method according to claim 1, wherein the metadata is encoded in one of the following formats:
(a) 6b/8b encoding; and
(b) 8b/10b encoding.

9. A system comprising:
(a) a video capture subsystem for generating video data;
(b) a post-production subsystem having a reference display and a processor configured to receive and edit the video data generated by the video capture subsystem and display the video data on the reference display; and
(c) a display subsystem having a display and a video processor configured to receive the video data edited by the post-production subsystem and display the video data on the display;
wherein at least one of the video capture subsystem, post-production subsystem and display subsystem is configured to encode metadata in the video data by embedding metadata in one or more chrominance portions of the video data, and the display subsystem is configured to apply the metadata for guiding processing or display of the video data, according to a director's creative intent for display of the video data; and
further wherein the at least one of the video capture subsystem, post-production subsystem and display subsystem is configured to:
locate black video frames preceding a new scene in the video data;
embed the metadata in chrominance portions of pixels in the black video frames, if available; and
if not available, embedding the metadata in one or more chrominance alternative portions of the video data.

10. A system according to claim 9, wherein the at least one of the video capture subsystem, post-production subsystem and display subsystem is configured to encode metadata in the video data by embedding the metadata in the chrominance portions of pixels for which luminance values are below a threshold value.

11. A system according to claim 10, wherein the at least one of the video capture subsystem, post-production subsystem and display subsystem is configured to:
(a) locate black mattes framing an image in the video data; and
(b) embed the metadata in the chrominance portions of pixels in the black mattes.

12. A system according to claim 10, wherein the at least one of the video capture subsystem, post-production subsystem and display subsystem is configured to:
(a) locate video frames in the video data having image areas for which luminance values are below the threshold value; and
(b) embed the metadata in the chrominance portions of pixels in the image areas.

13. A system according to claim 9, wherein the metadata corresponds to a new scene and the post-production subsystem is configured to:
(a) locate in the video data a boundary between the new scene and a preceding scene;
(b) insert one or more black video frames at the boundary; and
(c) embed the metadata in the chrominance portions of pixels in the black video frames.

14. The method of claim 1 wherein alternative portions of the video data if no black video frames precede a new scene comprise one a group, said group comprising: mattes, black bars, black boxes, pillar boxes and letter boxes.

15. The method of claim 1 wherein the step of embedding the metadata in alternative portions of the video data, if no black video frames precede a new scene further comprises:
locating the boundary between the present scene and the next scene;
inserting black video frames between the present scene and the next scene; and
embedding the metadata in the inserted black video frames.

16. The method of claim 1 wherein the step of embedding the metadata in alternative portions of the video data, if no black video frames precede a new scene further comprises:
locating the areas of low luminance in the frames preceding the next scene;
if the luminance is below a given threshold in a given area, determining whether there is sufficient bandwidth in the given areas; and
embedding the metadata in the given areas, if there is sufficient bandwidth.

* * * * *